United States Patent [19]

Spittle

[11] Patent Number: 4,476,185

[45] Date of Patent: Oct. 9, 1984

[54] BLOWABLE GLASS FIBER THERMAL INSULATION PRODUCT

[75] Inventor: Kevin S. Spittle, Gastonia, N.C.

[73] Assignee: Spittle Industries, Inc., Belmont, N.C.

[21] Appl. No.: 412,533

[22] Filed: Aug. 30, 1982

[51] Int. Cl.³ .............................................. B32B 27/00
[52] U.S. Cl. .................................. 428/290; 428/285; 428/299; 428/300; 428/902; 428/920
[58] Field of Search .......................... 241/4, 14, 18, 29; 428/218, 220, 288, 300, 285, 290, 299, 902, 920

[56] References Cited

U.S. PATENT DOCUMENTS

| | | | |
|---|---|---|---|
| 2,794,237 | 6/1957 | Dildilian et al. | 428/300 |
| 2,794,238 | 6/1957 | Dildilian et al. | 428/300 |
| 3,584,796 | 6/1971 | Earle | 241/4 |
| 4,296,164 | 10/1981 | Bemes et al. | 428/218 |
| 4,347,985 | 9/1982 | Simpson | 241/4 |
| 4,366,927 | 1/1983 | Kielmeyer | 241/4 |

Primary Examiner—James J. Bell
Attorney, Agent, or Firm—W. Thad Adams, III

[57] ABSTRACT

A process and apparatus for manufacturing a blowable glass fiber insulation product is disclosed. The product (104) resulting from the process and apparatus is also disclosed. This process includes the steps of cutting unbonded glass fiber matting (102) and lengths of twisted glass fiber yarn (101) raw material into predetermined relatively large size pieces. The pieces are mixed together and the mixture is fluffed to decrease its density. The mixture is then hammermilled into relatively smaller size pieces suitable for use as blowable insulation. In accordance with the apparatus according to this invention, a cutter (20) cuts glass fiber matting (102) and lengths of twisted glass fiber yarn (101) into relatively large size pieces which are mixed and then fluffed and further cut in a fluffer (40). A hammermill (60) is used for reducing the mixture into relatively smaller size pieces suitable for use as blowable insulation. The blowable insulation product (104) comprises loose, irregularly formed and separate clumps of glass fiber material approximately one inch (215 cm.) in diameter and having a density of 1 lb./cu./ft. (16 kg./cu./m.) and has a thermal resistance value of 3.3 per inch (2.5 cm.) of thickness.

5 Claims, 6 Drawing Figures

BLOWABLE GLASS FIBER THERMAL INSULATION PRODUCT

TECHNICAL FIELD AND BACKGROUND OF THE INVENTION

This invention relates to a process and apparatus for manufacturing a blowable glass fiber thermal insulation product. The invention also relates to the product itself produced by the process and apparatus. The concept disclosed generally involves the manufacture of a blowable glass fiber thermal insulation product from unbonded glass fiber matting and lengths of twisted glass fiber yarn. The glass fiber matting and yarn are processed in such a way as to result in a relatively low density, high thermal resistance value product in a loose form suitable for blowing into building walls and other cavities.

Thermal insulations are those materials or combinations of materials which, when properly applied, retard the flow of heat energy by conductive, convective and radiative transfer. These thermal insulation materials may be fibrous, particulate, film or sheet, block or monolithic, open or closed cell, or composites thereof which may, in addition, have chemical or mechanical bonding or support.

By retarding heat flow, thermal insulation can conserve insulation by reducing heat loss or gain from piping, ducts, vessels, equipment and building structures; control surface temperatures of equipment and structures for personnel protection and comfort; facilitate temperature control of a chemical process, a piece of equipment or a structure; prevent vapor condensation at surfaces having a temperature below the dew point of the surrounding atmosphere; or reduce temperature fluctuations within an enclosure when heating or cooling is not needed or not available.

Thermal insulations may also impede water vapor transmission, prevent or reduce damage to equipment and structures from exposure to fire or freezing conditions and reduce noise and vibration.

Thermal insulations normally comprise mineral, fibrous or cellular materials, organic fibrous or cellular materials, or metallic or metallized organic reflective membranes. The disclosure of this application relates specifically to fiberglass, a mineral fiber having low heat transfer properties ideal for insulation purposes. Fiberglass insulation is usually formed into batts which are sold in rolls and which are unrolled to cover the area to be insulated. In contrast, the product according to the present invention comprises clumps or nodules of fiberglass which are blown into walls or other enclosed spaces.

Because the raw materials for the product according to this invention are usually waste or scrap, the insulation can be manufactured very inexpensively. The properties of the raw materials, as described below, permit a very efficient blowable insulation to be simply and easily manufactured according to the process and apparatus also disclosed in this application.

Another characteristic of the product lies in its ability to be greatly compressed and shipped in relatively small volume containers. Because the insulation is not bound together by a bonding agent or an adhesive, the insulation is lighter in weight, does not need to be shredded before insulation, covers the insulation space more evenly and avoids packing down under its own weight.

One form of prior art insulation material is disclosed in the Bemis et al. Pat. No. 4,296,164. This blowable fiberglass thermal insulation is made by slitting and cross-cutting a blanket of fibrous glass wool into rectangular chunks and conveying the chunks to a bagging machine. As disclosed in the Bemis application, the insulation is first made by melting glass to form veils of glass fibers which are collected on a conveyor to form a fibrous glass blanket. A thermo-setting binder is then applied to the blanket to set the fibers in a particular arrangement. The binder is cured. Then the slitting and cross-cutting of the blanket takes place to form chunks of fibers which then break into smaller chunks at random during subsequent processing.

Another known prior art process involves grinding fiberglass into small pieces which are then sprayed with an adhesive. The fiberglass is then compressed very tightly into a container for shipment. The fiberglass "blooms" into a product of suitable density for insulation when the insulation is removed from its container. However, the product is still in one large piece because of the adhesive, making it necessary for the installer to process the product through a shredder to break the fiberglass into small pieces suitable for use with a blower.

In the product according to the present invention, these difficulties are circumvented by avoiding the use of any type of binder or adhesive.

SUMMARY OF THE INVENTION

Therefore, it is an object of the invention to provide a process and apparatus for manufacturing a blowable glass fiber thermal insulation product from unbonded glass fiber matting and lengths of twisted fiberglass yarn.

It is another object of the present invention to provide a process and apparatus for manufacturing a blowable glass fiber thermal insulation product having a low density and high thermal resistance value from inexpensive fiberglass scrap material.

It is another object of the present invention to provide a process and apparatus for manufacturing a blowable glass fiber thermal insulation product from scrap material having physical properties resulting from previous mechanical processing without the use of a binder or an adhesive.

It is yet another object of the present invention to provide a blowable glass fiber thermal insulation product manufactured according to the process disclosed herein and on the apparatus disclosed herein.

These and other objects and advantages of the present invention are achieved in the preferred embodiment of the apparatus described below by providing a cutter for cutting glass fiber matting and yarn a first time into pre-determined relatively large size pieces. These pieces are then mixed and the density of the mixture is decreased by fluffing the mixture and cutting the relatively large size pieces of matting and yarn into intermediate size pieces. The mixture is then hammermilled into relatively smaller size pieces suitable for use as blowable insulation.

The process according to the present invention includes the steps of cutting glass fiber matting and yarn a first time into pre-determined, relatively large size pieces. The pieces of cut matting and yarn are then mixed together and fluffed to decrease its density and cut it into intermediate size pieces. The mixture of fluffed matting and yarn is then hammermilled into relatively smaller size pieces suitable for use as blowable insulation. The process may also include the step of applying a surface of dust-retardant chemical to the glass fibers to prevent dust dispersion during subsequent processing and application of the insulation.

The insulation product manufactured according to the process and apparatus described above has physical properties resulting from previuos mechanical processing of the fiberglass scrap material without the use of a binder or an adhesive. The product preferably comprises loose, irregularly formed and separate clumps of glass fiber material approximately 1 in. (2.5 cm.) in diameter and having a density of approximately 1 lb./cu./ft. (16 kg./cu./m) and a thermal resistance value of 3.3 per in. (2.54 cm.) of thickness.

BRIEF DESCRIPTION OF THE DRAWINGS

Some of the objects of the invention have been set forth above. Other objects and advantages of the invention will appear as the description of the invention proceeds, when taken in conjunction with the following drawings in which.

DESCRIPTION OF THE PEFERRED EMBODIMENT

Figure 1:
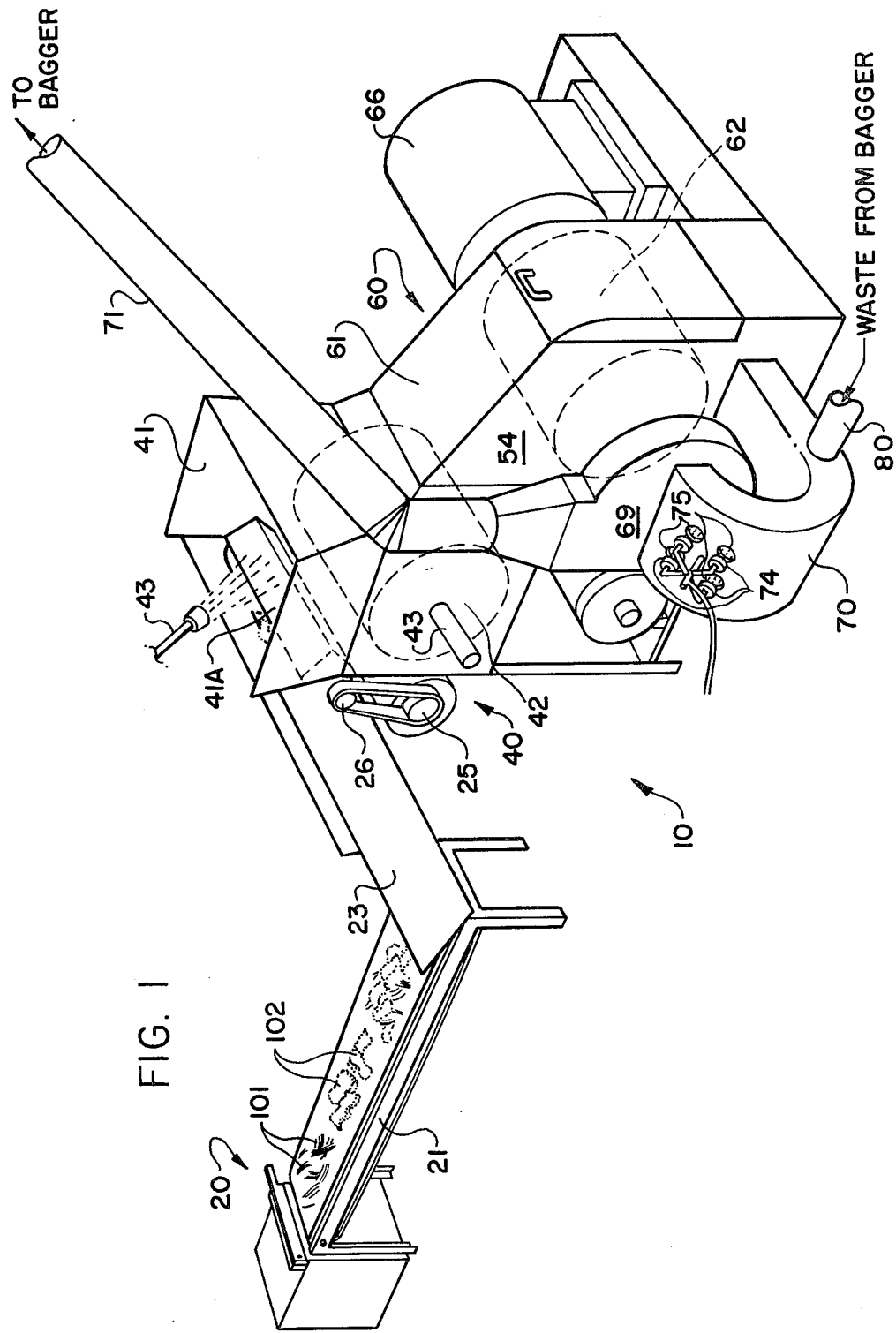
FIG. 1 is a perspective view of a preferred embodiment of the apparatus according to this invention.

Referring now specifically to the drawings, an apparatus according to the present invention is illustrated in FIG. 1 and broadly designated by reference numeral 10. The apparatus generally comprises a cutter 20, a fluffer assembly 40 and a hammermill assembly 60.

Figure 6:
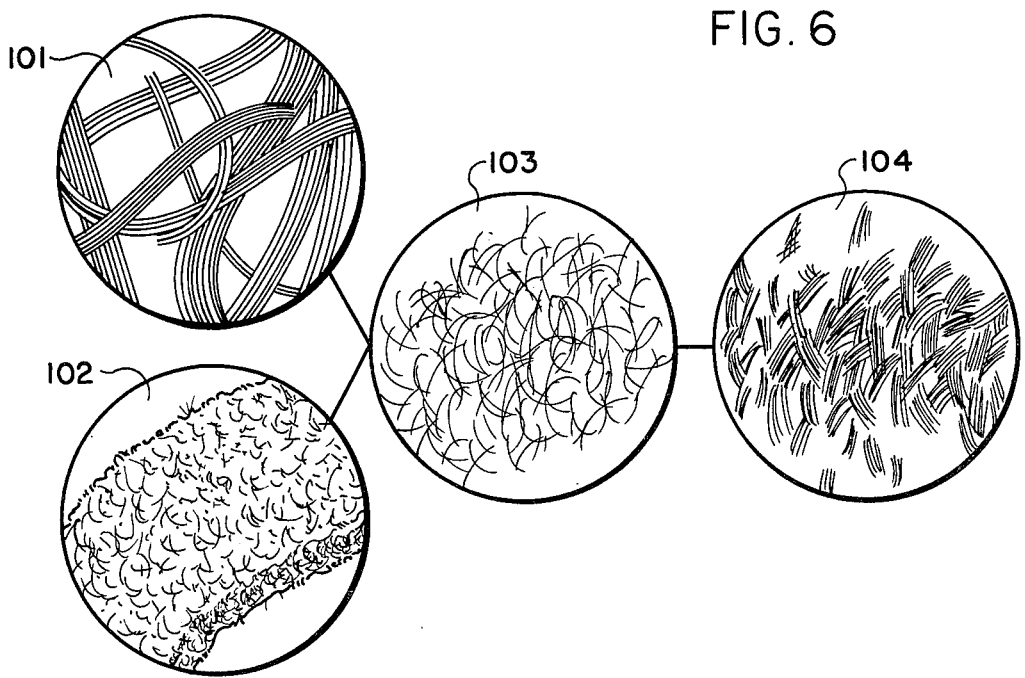
FIG. 6 illustrates the physical appearance of the raw materials from which the product is comprised, its appearance at an intermediate step in the process, and its final physical appearance.

The apparatus is designed to use as raw materials several types and forms of scrap glass fiber material. Two scrap materials according to the present invention are shown in FIG. 6 and comprise lengths of twisted glass fiber yarn 101 and unbonded glass fiber matting trim 102. The glass fiber yarn 101 may be of any length but typically is hundreds of yards long. The glass fiber matting 102 is comprised of needlepunched glass fiber matting of the type used in the automobile industry to insulate catalytic converters from the underside of an automobile body. The glass fiber matting 102 used is typically rather dense and is needlepunched to form a mechanical bond between the constituent glass fibers in the mat. No adhesive or other bonding agent is present. The glass fiber matting 102 usually weighs approximately 3 lb./cu./ft. The glass fiber yarns 101 usually weigh approximately 7-8 lb./cu.ft.

The glass fiber yarn 101 and glass fiber matting 102 are mixed, preferably in a proportion of 60%-70% of the glass fiber matting 102 to 30%-40% of the glass fiber yarn 101. After an initial cutting step the mixed glass fibers 101 and matting 102 are fluffed to form an intermediate product 102 having an average staple length of from 2-3 inches. The product is then hammermilled to produce the final blowable glass fiber thermal insulation product 104, as is shown in FIG. 6. The final product has a density of approximately 1 lb./cu./ft. and a thermal resistance value of 3.3 per inch of thickness.

The insulation product 104 comprises loose, irregularly formed and separate clumps of glass fiber material approximately one inch in diameter. The insulation product 104 may also include a sprayed finish of ethelyne glycol at a rate of approximately 1.5% by weight to prevent dust dispersion during subsequent processing and application of the insulation product.

Figure 2:
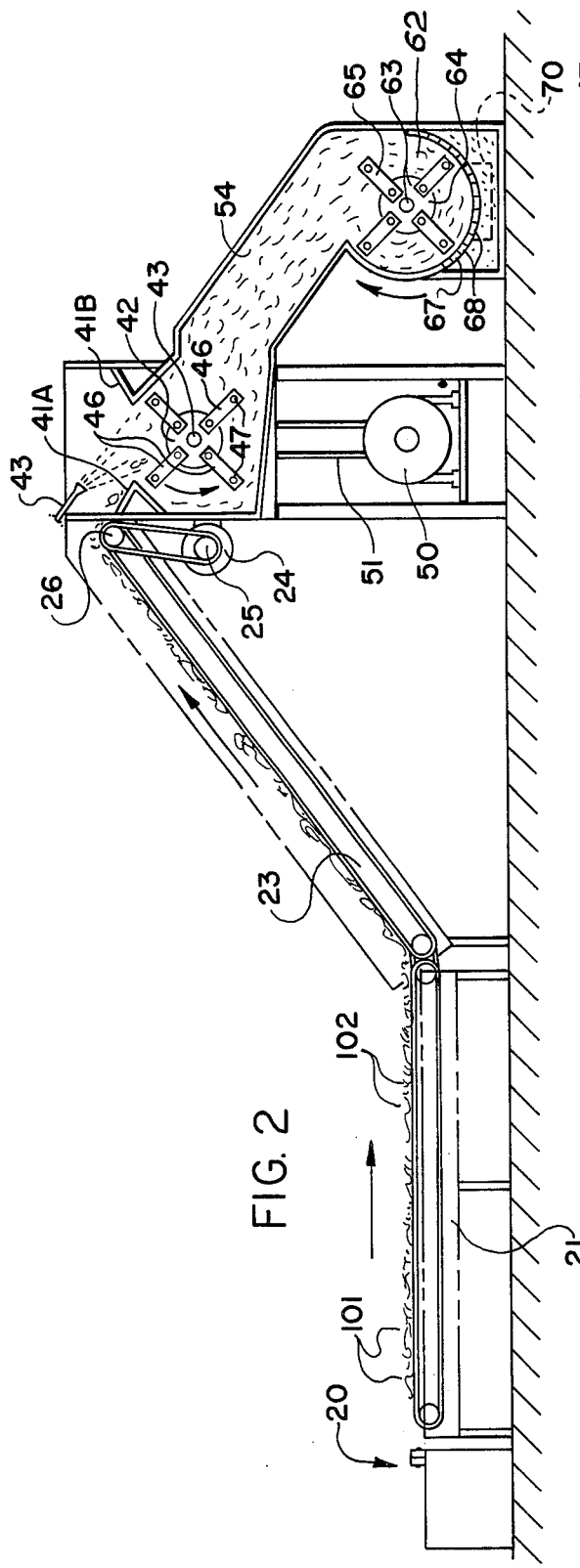
FIG. 2 is a vertical cross-sectional view of a preferred embodiment of the apparatus shown in FIG. 1.

Referring now to FIG. 1, the cutter 20 is used to cut or chop the extremely long lengths of glass fiber yarn 101 and the large chunks of glass fiber matting 102 into managable size for further processing. The cutter 20 may preferably be a guillotine type of cutter which chops the yarn and matting into 4-6 inch lenghts for further processing. The glass fiber yarns 101 and the glass fiber matting 102 may be cut separately and then mixed together in the proper proportions for further processing or they may be mixed together first and then cut by the cutter 20. Furthermore, the cutter 20 need not be contiguous to the remainder of the apparatus shown in FIG. 1. The cutting operation may take place elsewhere with the 4-6 inch lengths of yarn 101 and matting 102 then being delivered to a table conveyor 21. The table conveyor 21 moves the yarn 101 and matting 102 to an elevator conveyor 23. The table conveyor 21 and elevator conveyor 23 are driven by a suitable electric motor 24 through a drive pulley 25 and a driven pulley 26, as also shown in FIGS. 1 and 2. At the discharge end of the elevator conveyor 23, the mixture is deposited into a hopper 41. Restrictor plates 41a and 41b concentrate the mixture in the center of the hopper 41. At this point, the mixture may be sprayed with some suitable liquid to retard dust. For this purpose, a spray head 43 connected to a suitable supply (not shown) is provided for spraying the mixture as it passes into the supply hopper 41.

Figure 3:
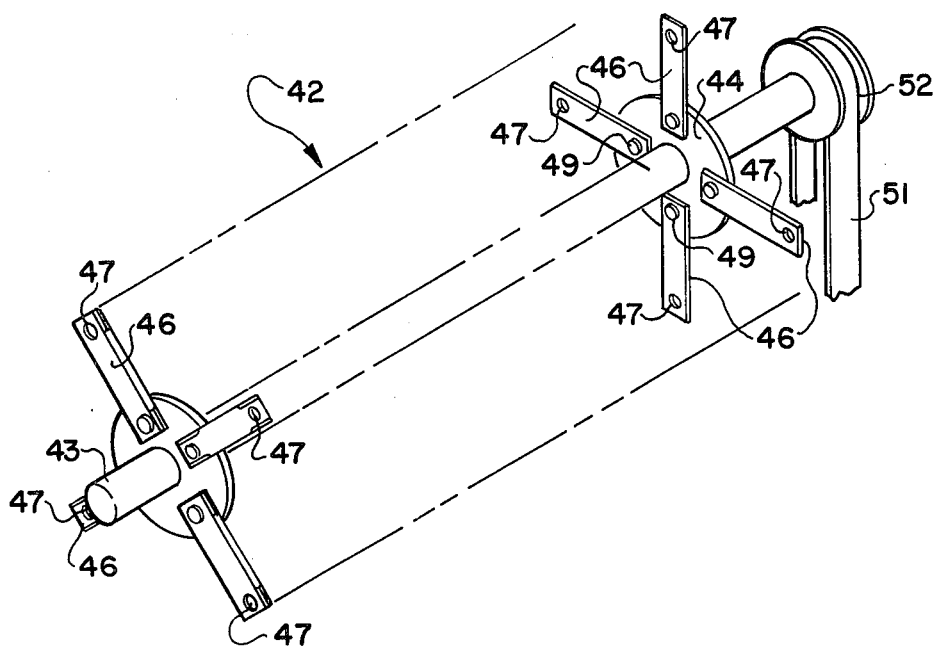
FIG. 3 is a fragmentary perspective view of the fluffer according to the present invention.

Positioned directly below hopper 41 is a fluffer 42. Referring now to FIG. 3, the fluffer 42 is actually a modified hammermill comprised of a central shaft 43 with a plurality of blade holders 44 positioned on shaft 43 for rotation therewith. To each blade holder 44 a plurality of blades 46 is attached. The arrangement of the blades 46 on the plade holder 44 may be staggered along the length of the shaft 43 to provide a smoother, more progressive cutting action.

Figure 4:
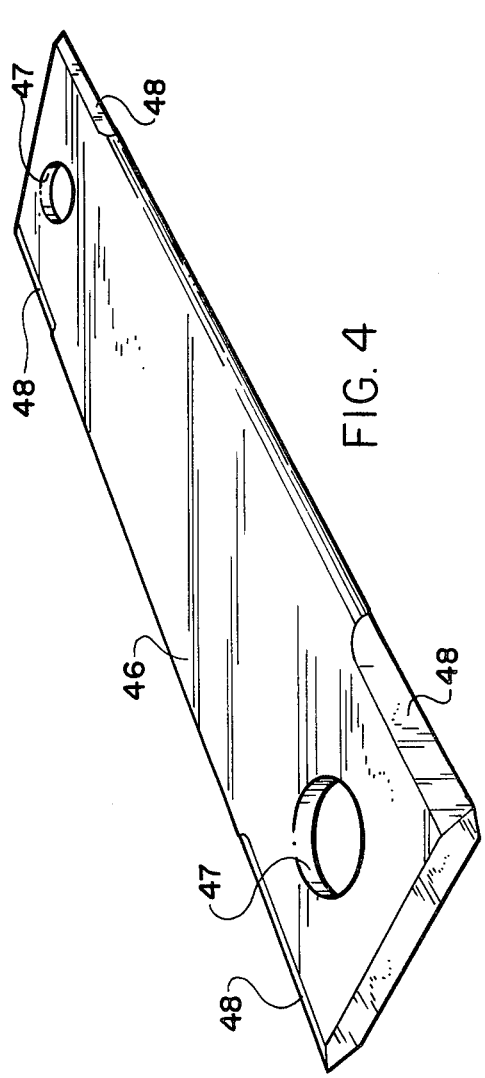
FIG. 4 is an enlarged perspective view of one of the fluffer blades shown in FIG. 3.
Figure 5:
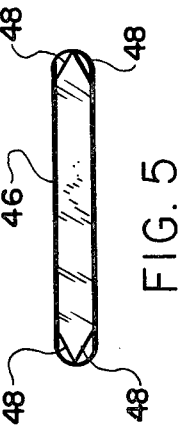
FIG. 5 is an end elevational view of the fluffer blade shown in FIG. 4.

Each blade 46 is formed from a single length section of iron or steel. A through aperture 47 is provided in each end. As is best shown in FIGS. 4 and 6, the opposing, longitudinally extending edges adjacent each end are sharpened into cutting edges 48. Referring again to FIG. 3, each blade 46 is attached to blade holder 44 by means of a bolt 49 which extends through one of the apertures 47 and a mated hole (not shown) in blade holder 44. Apertures 47 and cutting edges 48 are provided on both ends of each blade 46 so that when the cutting edges 48 on one end of blade 46 become dull, the blade can be reversed, exposing a fresh cutting edge 48 for more efficient cutting.

The blades 46 are loosely mounted on blade holders 44 so that the blade is free to pivot around a point defined by the bolt 49. As the fluffer rotates, the eccentrically mounted blades 46 are extended in radial alignment with shaft 43 by centrifugal force. Permitting the blades to move loosely around the bolts 49 causes the blades to flail as the fluffer rotates. As is best shown in FIG. 2, the fluffer rotates counterclockwise, thereby retaining the fiber in the fluffer enclosure for a longer period of time, resulting in a greater reduction in mixture density.

In the preferred embodiment, the fluffer 42 is driven by a motor 50. Motion from the motor is transmitted by means of a drive belt 51 which rides in a suitably sized pulley 52 as is shown in FIG. 3. After processing by the fluffer 42, the glass fiber mixture has been considerably reduced in density and shortened to clumps of fibers having a length of approximately 2–3 inches. From the fluffer 42, the fibers are conveyed down a shute 54 to the hammermill assembly 60. A hammermill 62 is contained within a suitably sized metal housing 61 and includes an axle 63 rotatably mounted within housing 61. Axle 63 is rotated by direct drive from an electric motor 66. A plurality of spaced-apart blade holders 64 is attached thereto for rotation with shaft 63. Each blade holder 64 carries a plurality of blades 64 in exactly the same fashion as the fluffer 42 illustrated in FIGS. 2 and 3. However, the blades 65 of the hammermill 60 do not have sharpened edges but are blunt, thereby preventing the fiber mixture from being chopped into extremely small particles.

Positioned beneath and in closely spaced-apart relation to the arc cut by the rotation of blades 65 is a screen 67 defining the perforations 68, which are approximately 3 inches in length and one inch in width. The rapidly rotating blades 65 force the fiberglass mixture through the perforations 68. As a result, the clumps of fibers are approximately one inch in diameter and in their final form as blowable glass fiber thermal insulation product 104, as shown in FIG. 6.

From the hammermill enclosure beneath the perforated screen 67 a centrifugal fan 69 exhausts the insulation product 104 through ductwork 70 and through a conduit 71 to a bagger (not shown). Fluid nozzles 74 spray a suitable dust retardant chemical through apertures 75 as the product is removed from housing 61 by fan 69. Waste from the bagging operation is conveyed by ductwork 80 back into duct 70 between housing 61 and fan 69. Thus, any waste from the bagging operation is recycled back to the bagger, thereby reducing wastage.

The process for manufacturing the insulation product 104, as described above, comprises the step of first cutting the glass fiber matting and yarn into pre-determined relatively large size pieces. This may be done either before or after mixing the unbonded glass fiber matting and lengths of twisted glass fiber yarn together. The mixed yarn and matting 102 are fluffed to cut the matting into relatively smaller pieces and to decrease its density. Then, the mixture is hammermilled into relatively smaller sized pieces suitable for use as blowable insulation.

In the fluffing process, the mixture of cut matting and yarn may be cut into pieces of intermediate size. Also, a surface coating of a dust retardant chemical may be applied to the glass fibers to prevent dust dispersion during subsequent processing and application of the insulation. The form and composition of the insulation product 104 is ideal for compressing into bags for shipment and storage.

A process and apparatus for manufacturing a blowable glass fiber thermal insulation product from unbonded glass fiber matting and lengths of twisted glass fiber yarn raw material has been described above. The product resulting from the process and apparatus has also been described. Various details of the invention may be changed without departing from its scope. Furthermore, the foregoing description of a preferred embodiment of the present invention is provided for the purpose of illustration only and not for the purpose of limitation -- the invention being defined by the claims.

I claim:

1. A blowable glass fiber thermal insulation product manufactured from unbonded fiberglass scrap material without the use of a binder or an adhesive, said product comprising loose, irregularly formed and separate clumps of entangled glass fiber material approximately 1 in. (2.5 cm.) in diameter and having a density of approximately 1 lb./cu./ft. (16 kg./cu.m.), and a thermal resistance value of 3.3 per inch (2.54 cm.) of thickness.

2. The product according to claim 1 wherein said fiberglass scrap material comprises needlepunched fiberglass matting having a density of 3 lb./cu./ft. (48 Kg./cu./m.) and fiberglass twisted yarn having a density of 7–8 lb./sq./ft. (112–128 kg./cu./m.) adhered together by mixing.

3. The product according to claim 2 wherein said fiberglass matting comprises 60% to 70% of the total weight of the product and said twisted yarn comprises 30% to 40% of the weight of the product.

4. A product according to claim 3 wherein said product includes a surface application of 1.5% ethelyne glycol by weight to retard dust dispersion during processing and subsequent handling.

5. A blowable glass fiber thermal insulation product manufactured from 60% to 70% unbonded needlepunched fiberglass matting by weight having a density of 3 lb./cu./ft. (48 kg./cu./m.) and 30% to 40% twisted yarn by weight having a density of 7–8 lb./cu./ft. (112–128 kg./cu./m.), without the use of a binder or an adhesive, said product omprising loose, irregularly formed and separate clumps of entangled glass fiber material approximately 1 in. (2.5 cm.) in diameter and having a density of approximately 1 lb./cu./ft. (16 kg./cu./m.), and a thermal resistance value of 3.3 per inch (2.5 cm.) of thickness.

* * * * *